Patented Feb. 20, 1923.

1,446,163

UNITED STATES PATENT OFFICE.

ARTHUR HUGH DAVIES, OF CARLISLE, ENGLAND, ASSIGNOR TO SCOTTISH DYES, LIMITED, OF CARLISLE, CUMBERLAND, ENGLAND.

MANUFACTURE OF OXY DERIVATIVES OF ANTHRAQUINONE.

No Drawing.   Application filed July 20, 1921.   Serial No. 486,2

*To all whom it may concern:*

Be it known that I, ARTHUR HUGH DAVIES, a subject of the King of Great Britain and Ireland, and residing at Murrell Hill Works, Carlisle, in the county of Cumberland, England, have invented certain new and useful Improvements in and Relating to the Manufacture of Oxy Derivatives of Anthraquinone, of which the following is a specification.

This invention relates to the production of oxy-derivatives of anthraquinone and is particularly concerned with the production of alizarin.

As is well known, the process of manufacture of alizarin since the discovery of the synthetical production of this colouring matter in the year 1868 by Graebe and Liebermann, has been almost exclusively the one developed in the following year and patented in this country of Caro, Graebe and Liebermann, and almost simultaneously by Perkin.

This consists in autoclaving the so-called silver salt or anthraquinone-2-sulphonate of sodium with caustic soda solution, and with the addition of an oxidizing agent such as saltpetre or chlorate of soda.

The present invention is based upon the observation that the chlorine atoms in chlor substituted derivatives of anthraquinone, can be replaced by hydroxyl groups and a further hydroxyl group introduced by treatment of the chlor substituted derivatives with a base in the presence of a suitable oxidizing agent.

Thus, for example, in accordance with the invention, a mono-chlor substitution product of an anthraquinone may be autoclaved with solutions of caustic alkalies in the presence of a suitable oxidizing agent which expression as employed herein means chlorates or nitrates or bodies having a like effect in the reaction and a dihydroxy derivative of anthraquinone obtained.

By treating 2 chlor anthraquinone in this manner alizarin may be produced.

The following particulars are given by way of example for the purpose of indicating the nature of the invention:—

A mixture of the following composition: 78 parts of 2 chlor anthraquinone, 275 parts of caustic soda, 11.3 parts of sodium chlorate, and 850 parts water is introduced into an autoclave provided with a stirrer, raised to a temperature of 170° C. and maintained thereat for 24 hours.

The product of this treatment is diluted by the addition of 2,000 parts of water, boiled, filtered and the residue again extracted with a boiling dilute solution of caustic soda. The combined filtrates which will be of a purple colour are acidified with dilute hydrochloric acid, the alizarin filtered off and washed with condensed water until clean.

Alizarin, it is to be observed was first produced by Graebe and Liebermann by fusion of dibromanthraquinone with caustic potash (Annalen Spl. vol. 7, p. 289) and also from 2-bromanthraquinone in the same way, but it is generally allowed that combined bromine is more rapidly removed from aromatic nuclei by chemical reagents, than combined chlorine, and in any case the conduct of 2-chloranthraquinone in this reaction is not to be deduced from that of the corresponding brom derivative.

Having now described my invention, what I claim as new and desire to secure by Letters Patent is:—

1. The process of producing oxy-derivatives of anthraquinone, according to which the chlorine atoms in chlor substituted derivatives of anthraquinone, are replaced by hydroxyl groups and a further hydroxyl group introduced by treatment of the chlor substituted derivatives with a base in the presence of a suitable oxidizing agent.

2. The process of producing oxy-derivatives of anthra-quinone as claimed in claim 1, in which a chlor substitution product of anthraquinone is autoclaved with a solution of caustic alkali in the presence of a suitable oxidizing agent.

3. The process of producing oxy-derivatives of anthraquinone as claimed in claim 2, in which a chlorate is employed as oxidizing agent.

4. The process of producing oxy-derivatives of quinones as claimed in claim 3, in which 2 chlor anthraquinone is treated with the production of alizarin.

In testimony whereof I have signed my name to this specification.

ARTHUR HUGH DAVIES.